(12) United States Patent
Usami et al.

(10) Patent No.: US 6,258,509 B1
(45) Date of Patent: *Jul. 10, 2001

(54) OPTICAL INFORMATION RECORDING MEDIUM

(75) Inventors: Yoshihisa Usami; Michihiro Shibata, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/126,605

(22) Filed: Jul. 31, 1998

(30) Foreign Application Priority Data

Jul. 31, 1997 (JP) .................................................. 9-221000

(51) Int. Cl.⁷ ........................................................ G11B 7/24
(52) U.S. Cl. ............................................................ 430/270.19
(58) Field of Search ................................. 430/945, 270.2, 430/270.21, 270.19; 369/288

(56) References Cited

U.S. PATENT DOCUMENTS

| | | | |
|---|---|---|---|
| 4,626,496 | * 12/1986 | Sato | 430/945 |
| 4,714,667 | 12/1987 | Sato et al. | 430/945 |
| 5,171,731 | 12/1992 | Inagaki et al. | 503/227 |
| 5,227,495 | 7/1993 | Inagaki et al. | 430/496 |
| 5,376,173 | 12/1994 | Haze et al. | 106/804 |
| 5,391,462 | 2/1995 | Arioka et al. | 430/945 |
| 5,419,939 | 5/1995 | Arioka et al. | 430/945 |
| 5,665,468 | * 9/1997 | Sekiya et al. | 428/332 |
| 5,674,649 | * 10/1997 | Yoshioka et al. | 430/270.13 |
| 5,879,772 | * 3/1999 | Morishima et al. | 430/270.16 |
| 5,998,094 | * 12/1999 | Ishida et al. | 430/270.49 |

FOREIGN PATENT DOCUMENTS 0 820 057 A1 1/1998 (EP) .
0 833 314 A2 4/1998 (EP) .
0 860 820 A1 8/1998 (EP) .

OTHER PUBLICATIONS

JP 02 164586 A, *Patent Abstracts of Japan*, vol. 14, No. 420, Jun. 25, 1990.
JP 04 175188A, *Patent Abstracts of Japan*, vol. 16, No. 480, Jun. 23, 1992.
European Search Report dated Nov. 4, 1998.

* cited by examiner

*Primary Examiner*—Martin Angebranndt
(74) *Attorney, Agent, or Firm*—Sughrue, Mion, Zinn, Macpeak & Seas, PLLC

(57) ABSTRACT

An optical information recording medium is composed of a substrate, a recording dye layer on which information can be recorded by irradiation with a laser beam, and a light-reflecting layer overlaid in order, in which the recording dye layer employs a dye having an organic counter ion (such as a cyanine dye of the formula (I):

$$[DYE^+]_n X^{n-} \qquad (I)$$

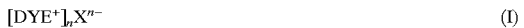

in which $DYE^+$ is a monovalent cyanine dye cation, n is an integer not less than 2, and $X^{n-}$ is an organic n-valent anion), and the light-reflecting layer is made of Ag or Ag-containing alloy.

13 Claims, No Drawings

OPTICAL INFORMATION RECORDING MEDIUM

FIELD OF THE INVENTION

This invention relates to an optical information recording medium of heat mode type on which information can be recorded and reproduced by means of a laser beam.

BACKGROUND OF THE INVENTION

An information recording medium on which information can be only once recorded by means of a laser beam is known as a recordable compact disc (i.e., CD-R), and has been getting widely used because it can be produced on a relatively small scale and at low cost, as compared with a conventional compact disc (i.e., CD).

The optical disc of CD-R type generally has a multi-layer structure typically comprising a disc-shaped transparent substrate (support), a recording layer comprising an organic dye, a light-reflecting layer comprising a metal, and a protective layer made of resin overlaid in this order. The information can be recorded by irradiating the disc with a laser beam of near infrared region (usually 780 nm). By the irradiation of the laser beam, irradiated area of the recording layer is locally heated to change its physical or chemical characteristics, and thus pits are formed in the recording layer. Since the optical characteristics of the formed pits are different from those of the area having been not irradiated, the information is optically recorded. The recorded information can be read by a reproducing procedure comprising the steps of irradiating the recording layer with a laser beam having the same wavelength as that employed in the recording procedure, and detecting the light-reflection difference between the pits and the area having been not irradiated.

In order to reproduce the recorded information by means of a commercially available CD player, the CD-R is required to reflect the laser beam of near infrared region at a reflectance of more than 70%. Therefore, the light-reflecting layer is preferably provided on the recording dye layer. The light-reflecting layer is generally made of Au (gold), because it gives a high reflectance and a high corrosion resistance. However, the light-reflecting layer made of gold has certain disadvantageous features in that gold is expensive and further that the protective layer provided on the light-reflecting layer of Au (gold) exhibits golden gloss which makes printed letters or figures on the protective layer unclear.

The light-reflecting layer can be made of metal other than gold. Japanese Patent Provisional Publications No. H3-286432 and No. H4-49539 disclose an optical information recording medium having a light-reflecting layer made of Ag (silver), Cu (copper) or alloys essentially consisting of them. According to Japanese Patent Provisional Publication No. H3-286432, the light-reflecting layer of Ag (silver) or Cu (copper) has a reflectance higher than that of the layer of Au.

As the dye compound contained in the recording layer, a cyanine dye having a benzoindolenine structure (in which a benzene ring is condensed with an indolenine skeleton) is stated to be advantageously used (Japanese Patent Provisional Publication No. H4-175188), and further the cyanine dye having $ClO_4^-$ ion is particularly preferred to use.

However, the present inventors have found that the cyanine dye having $ClO_4^-$ ion in the recording dye layer is liable to lower the reflectance of the light-reflecting layer of Ag or Ag-containing alloy.

Accordingly, it is an object of the present invention to provide an optical information recording medium having a high light-reflectance. Particularly, the object of the invention is to provide an optical information recording medium having a high light-reflectance in the case that the light-reflecting layer is made of Ag or Ag-containing alloy.

SUMMARY OF THE INVENTION

It has been not known why the reflectance is lowered in the case of using a cyanine dye having $ClO_4^-$ ion. The study of the inventors has revealed that $ClO_4^-$ and Ag react to form Ag compound at the interfacial zone between the recording dye layer and the light-reflecting layer because Ag is more active and unstable than Au.

The inventors have further studied to provide a CD-R having a high reflectance in the case that the light-reflecting layer is made of Ag or Ag-containing alloy, and found that a dye having an organic counter ion (for example, a cyanine dye having an organic counter ion) ensures a high reflectance of the light-reflecting layer.

The present invention resides in an optical information recording medium of heat mode type comprising a substrate, a recording dye layer on which information can be recorded by irradiation with a laser beam, and a light-reflecting layer overlaid in order, wherein the recording dye layer comprises a dye having an organic counter ion, and the light-reflecting layer is made of inorganic material comprising Ag.

The preferred embodiments of the invention are as follows.

(1) The light-reflecting layer comprises Ag or an alloy of Ag with at least one element selected from the group consisting of Pt, Cu, Au and Al.

(2) The dye having an organic counter ion contained in the recording dye layer is a cyanine dye.

(3) The recording dye layer contains a cyanine dye represented by the following formula (I):

in which $DYE^+$ represents a monovalent cyanine dye cation, n represents an integer not less than 2, and $X^{n-}$ represents an organic n-valent anion.

(4) In the above (3), the cyanine dye is represented by the following formula (II):

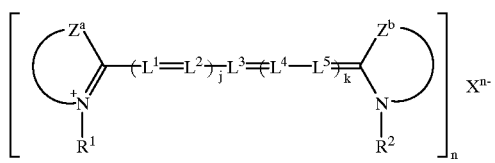

in which each of Za and Zb independently represents an atomic group necessary for forming a 5- or 6-membered nitrogen-containing heterocyclic ring; each of $R^1$ and $R^2$ independently represents an alkyl group or an aryl group; each of $L^1$, $L^2$, $L^3$, $L^4$ and $L^5$ independently represents a methine group which may have a substituent group, and in the case that at least one of $L^1$ to $L^5$ has a substituent group, two of $L^1$ to $L^5$ may be combined to form a ring; j is 0, 1 or 2; k is 0 or 1; $X^{n-}$ represents an organic n-valent anion and n is an integer of not less than 2.

(5) In the above (3), the cyanine dye is represented by the following formula (IIA):

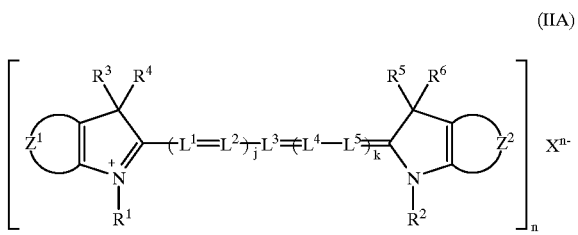

(IIA)

in which each of $Z^1$ and $Z^2$ independently represents an atomic group necessary for forming an indolenine nucleus or a benzoindolenine nucleus; each of $R^1$ and $R^2$ independently represents an alkyl group or an aryl group; each of $R^3$, $R^4$, $R^5$ and $R^6$ independently represents an alkyl group; each of $L^1$, $L^2$, $L^3$, $L^4$ and $L^5$ independently represents a methine group which may have a substituent group, and in the case that at least one of $L^1$ to $L^5$ has a substituent group, two of them may be combined to form a ring; j is 0, 1 or 2; k is 0 or 1; $X^{n-}$ represents an organic n-valent anion and n is an integer of not less than 2.

DETAILED DESCRIPTION OF THE INVENTION

In the optical information recording medium of the invention, the recording dye layer provided on the sub-strate comprises a dye having an organic counter ion, and the light-reflecting layer provided on the recording dye layer is made of inorganic materials comprising Ag.

The dye employed for the invention is not restricted, provided that it has an organic counter ion, but cyanine dyes and oxonol dyes are preferred. Particularly preferred is a cyanine dye having an organic counter ion because it can be easily prepared.

First, the detailed description about the cyanine dye is given below.

The cyanine dye employed for the invention is preferably a compound having the following formula (I):

[DYE$^+$]$_n$X$^{n-}$      (I)

In the formula, DYE$^+$ represents monovalent cyanine dye cation having no anionic substituent. $X^{n-}$ represents an organic n-valent anion, and n represents an integer not less than 2 (namely, $X^{n-}$ represents an organic anion having the valence of not less than 2).

Examples of the polyvalent organic anions represented by $X^{n-}$ include carboxylate ions (e.g., succinate ion, maleate ion, fumarate ion, and terephthalate ion), aromatic disulfonate ions (e.g., benzene-1,3-disulfonate ion, 3,3'-biphenyldisulfonate ion, naphthalene-1,5-disulfonate ion, naphthalene-1,6-disulfonate ion, naphthalene-2,6-disulfonate ion, 1-methylnaphthalene-2,6-disulfonate ion, naphthalene-2,7-disulfonate ion, naphthalene-2,8-disulfonate ion, 2-naphthol-6,8-disulfonate ion, 1,8-dihydroxynaphthalene-3,6-disulfonate ion, and 1,5-dihydroxynaphthalene-2,6-disulfonate ion), aromatic trisulfonate ions (e.g., naphthalene-1,3,5-trisulfonate ion, naphthalene-1,3,6-trisulfonate ion, naphthalene-1,3,7-trisulfonate ion, 1-naphthol-3,6,8-trisulfonate ion, and 2-naphthol-3,6,8-trisulfonate ion), aromatic tetrasulfonate ions (e.g., naphthalene-1,3,5,7-tetra-sulfonate ion), aliphatic polysulfonate ions (e.g., butane-1,4-disulfonate ion, and cyclohexane-1,4-disulfonate ion), and polysulfuric monoesters (e.g., propylene glycol-1,2-disulfate, and polyvinyl alcohol polysulfate ester ions). In the above formula, $X^{n-}$ is preferably an organic anion having 2–4 valence, more preferably an organic anion having 2 or 3 valence and further preferably a divalent organic anion.

The cyanine dye compound further preferably employed for the invention has the following formula (II):

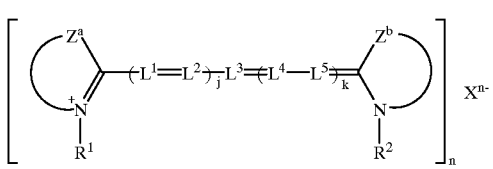

(II)

In the above formula, each of Za and Zb independently represents an atomic group required for forming a 5- or 6-membered nitrogen-containing heterocyclic ring. Each of $R^1$ and $R^2$ independently represents an alkyl group or an aryl group. Each of $L^1$, $L^2$, $L^3$, $L^4$ and $L^5$ independently represents a methine group which may have a substituent group; and in the case that some of $L^1$–$L^5$ have a substituent group, they may be combined to form a ring. "j" is 0, 1 or 2; "k" is 0 or 1; "$X^{n-}$" represents an organic n-valent anion and "n" is an integer of not less than 2.

Examples of the 5- or 6-membered nitrogen-containing heterocyclic rings (nucleus) comprising the atomic group of Za or Zb include thiazole nucleus, benzothiazole nucleus, naphthothiazole nucleus, thiazoline nucleus, oxazole nucleus, benzooxazole nucleus, naphthooxazole nucleus, oxazoline nucleus, selenazole nucleus, benzo-selenazole nucleus, naphthoselenazole nucleus, selenazoline nucleus, tellurazole nucleus, benzotellurazole nucleus, naphthotellurazole nucleus, tellurazoline nucleus, imidazole nucleus, benzoimidazole nucleus, naphthoimidazole nucleus, pyridine nucleus, quinoline nucleus, isoquinoline nucleus, imidazo[4,5-b]quinozaline nucleus, oxadiazole nucleus, thiadiazole nucleus, tetrazole nucleus, and pyrimidine nucleus. Preferred are benzothiazole nucleus, imidazole nucleus, naphthoimidazole nucleus, quinoline nucleus, isoquinoline nucleus, imidazo[4,5-b] quinozaline nucleus, thiadiazole nucleus, tetrazole nucleus, and pyrimidine nucleus. The above rings may be condensed with a benzene ring or a naphthoquinone ring.

Each of the above 5- or 6-membered nitrogen-containing heterocyclic rings may have a substituent group (or atom). Examples of the substituent group (or atom) include a halogen atom (preferably, chlorine atom), an alkyl group (preferably, an alkyl group of straight chain having 1–6 carbon atoms) which may have a substituent group, and an aryl group (preferably, phenyl group). Examples of the substituent groups for the alkyl group include alkoxy group (e.g., methoxy group) and alkylthio group (e.g., methylthio group).

The alkyl group represented by $R^1$ or $R^2$ preferably has 1–18 (more preferably 1–8, further preferably 1–6) carbon atoms and may be a straight chain, a cyclic chain or a branched chain. The alkyl group of $R^1$ or $R^2$ may have a substituent group.

The aryl group represented by $R^1$ or $R^2$ preferably has 6–18 carbon atoms and may have a substituent group.

Examples of preferred substituent groups for the above alkyl or aryl group include an aryl group of 6–18 carbon atoms (e.g., phenyl, chlorophenyl, anisyl, toluyl, 2,4-di-t- amyl, and 1-naphthyl) which may have a substituent group, an alkenyl group (e.g., vinyl, and 2-methylvinyl), an alkynyl group (e.g., ethynyl, 2-methylethynyl, and 2-phenylethynyl), halogen atom (e.g., F, Cl, Br, and I), cyano group, hydroxyl group, carboxyl group, an acyl group (e.g., acetyl, benzoyl, salicyloyl, and pivaloyl), an alkoxy group (e.g., methoxy, butoxy, and cyclohexyloxy), an aryloxy group (e.g., phenoxy and 1-naphthoxy), an alkylthio group (e.g., methylthio, butylthio, benzylthio, and 3-methoxypropylthio), an arylthio group (e.g., phenylthio and 4-chlorophenylthio), an alkylsulfonyl group (e.g., methanesulfonyl and butanesulfonyl), an arylsulfonyl group (e.g., benzenesulfonyl and p-toluene-sulfonyl), a carbamoyl group of 1–10 carbon atoms, an amide group of 1–10 carbon atoms, an acyloxy group of 2–10 carbon atoms, an alkoxycarbonyl group of 2–10 carbon atoms, a heterocyclic group (e.g., aromatic heterocyclic rings such as pyridyl, thienyl, furyl, thiazolyl, imidazolyl and pyrazolyl, and aliphatic heterocyclic rings such as pyrrolidine ring, piperidine ring, morpholine ring, pyran ring, thiopyran ring, dioxane ring and dithiolan ring).

Preferably, each of $R^1$ and $R^2$ independently represents an unsubstituted alkyl group of straight chain having 1–8 (preferably 1–6, more preferably 1–4) carbon atoms, or an alkyl group of straight chain having 1–8 (preferably 1–6, more preferably 1–4) carbon atoms which is substituted with an alkoxy (preferably, methoxy) group or alkylthio (preferably, methylthio) group.

The methine group represented by $L^1$–$L^5$ may have a substituent group. Examples of the substituent groups include an alkyl group of 1–18 carbon atoms, an aralkyl group, and the groups described above as substituent groups for the alkyl or aryl group of $R^1$ or $R^2$. Among them, preferred examples are an alkyl group (e.g., methyl), an aryl group (e.g., phenyl), a halogen atom (e.g., Cl, Br), and an aralkyl group (e.g., benzyl). A particularly preferred substituent group is methyl group.

It is preferred that j and k represent 2 and 0, respectively or that each of j and k independently represents 0 or 1 in the above formulas.

The substituent groups of L1–$L^5$ may be combined to form a ring which preferably consists of 5 or 6 members and which may be condensed. The positions where the formed ring are connected depends on the length of the methine chain. If $L^1$–$L^5$ form a pentamethine chain, the positions for connecting are preferably $L^1$ and $L^3$, $L^2$ and $L^4$, or $L^3$ and $L^5$. When double condensed rings are formed, the positions for connecting are $L^1$ and $L^3$ and $L^5$. In that case, each set of $L^1$ and $R^1$, $L^5$ and $R^2$, and $L^3$ and $R^2$ may be combined to from a ring which preferably consists of 5 or 6 members. The ring formed by the substituent groups of $L^1$–$L^5$ preferably is a cyclohexene ring.

In the formula (II), $X^{n-}$ represents an organic n-valent anion and n represents an integer not less than 2.

Preferably, $X^{n-}$ in the formula (II) is an aromatic disulfonate ion or an aromatic trisulfonate ion. Examples of $X^{n-}$ include benzene-1,3-disulfonate ion, 3,3'-biphenyldisulfonate ion, naphthalene-1,5-disulfonate ion, naphthalene-1,6-disulfonate ion, naphthalene-2,6-disulfonate ion, 1-methylnaphthalene-2,6-disulfonate ion, naphthalene-2,7-disulfonate ion, naphthalene-2,8-disulfonate ion, 2-naphthol-6,8-disulfonate ion, 1,8-dihydroxynaphthalene-3,6-disulfonate ion, and 1,5-dihydroxynaphthalene-2,6-disulfonate ion. Most preferred are naphthalene-1,5-disulfonate ion, naphthalene-1,6-disulfonate ion, naphthalene-2,6-disulfonate ion, 1-methyl-naphthalene-2,6-disulfonate ion, naphthalene-2,7-disulfonate ion, and naphthalene-2,8-disulfonate ion. A particularly preferred example is naphthalene-1,5-disulfonate ion.

The cyanine dye compound preferably employable for the invention has the following formula (IIA):

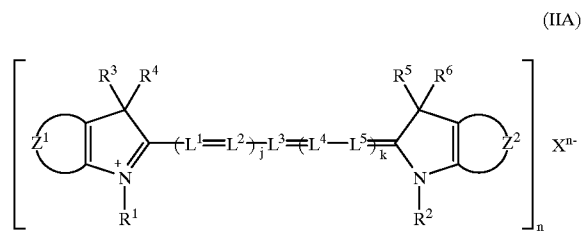

In the above formula, each of $Z^1$ and $Z^2$ independently represents an atomic group required for forming an indolenine nucleus or a benzoindolenine nucleus. Each of $R^1$ and $R^2$ independently represents an alkyl group or an aryl group. Each of $R^3$, $R^4$, $R^5$ and $R^6$ independently represents an alkyl group. Each of $L^1$, $L^2$, $L^3$, $L^4$ and $L^5$ independently represents a methine group which may have a substituent group; and in the case that some of $L^1$–$L^5$ have a substituent group, they may be combined to form a ring. "j" is 0, 1 or 2; "k" is 0 or 1; "$X^{n-}$" represents an organic n-valent anion and "n" is an integer of not less than 2.

The indolenine nucleus or benzoindolenine nucleus comprising the atomic group of $Z^1$ or $Z^2$ may have a substituent group. Examples of the substituent groups (or atoms) include a halogen atom (preferably, chlorine atom) and an aryl group (preferably, phenyl group).

The alkyl group represented by each of $R^3$, $R^4$, $R^5$ and $R^6$ preferably has 1–18 carbon atoms and may be a straight chain, a cyclic chain or a branched chain. Each set of $R^3$ and $R^4$, and $R^5$ and $R^6$ may be combined to form a ring. The alkyl group of $R^3$, $R^4$, $R^5$ or $R^6$ may have a substituent group. Preferred examples of the substituent group are the same as those described above for the alkyl or aryl group of $R^1$ or $R^2$. Preferably, each of $R^3$, $R^4$, $R^5$ and $R^6$ independently represents an unsubstituted alkyl group of straight chain having 1–6 carbon atoms (methyl and ethyl are particularly preferred).

Each of $R^1$, $R^2$, $L^1$, $L^2$, $L^3$, $L^4$, $L^5$, j, k, $X^{n-}$ and n in the formula (IIA) has the same meaning as described above for the formula (II), and the preferred examples of each are also the same as described above for the formula (II).

Preferred examples of the compound having the formula (I), which includes the formulas (II) and (IIA), are shown below.

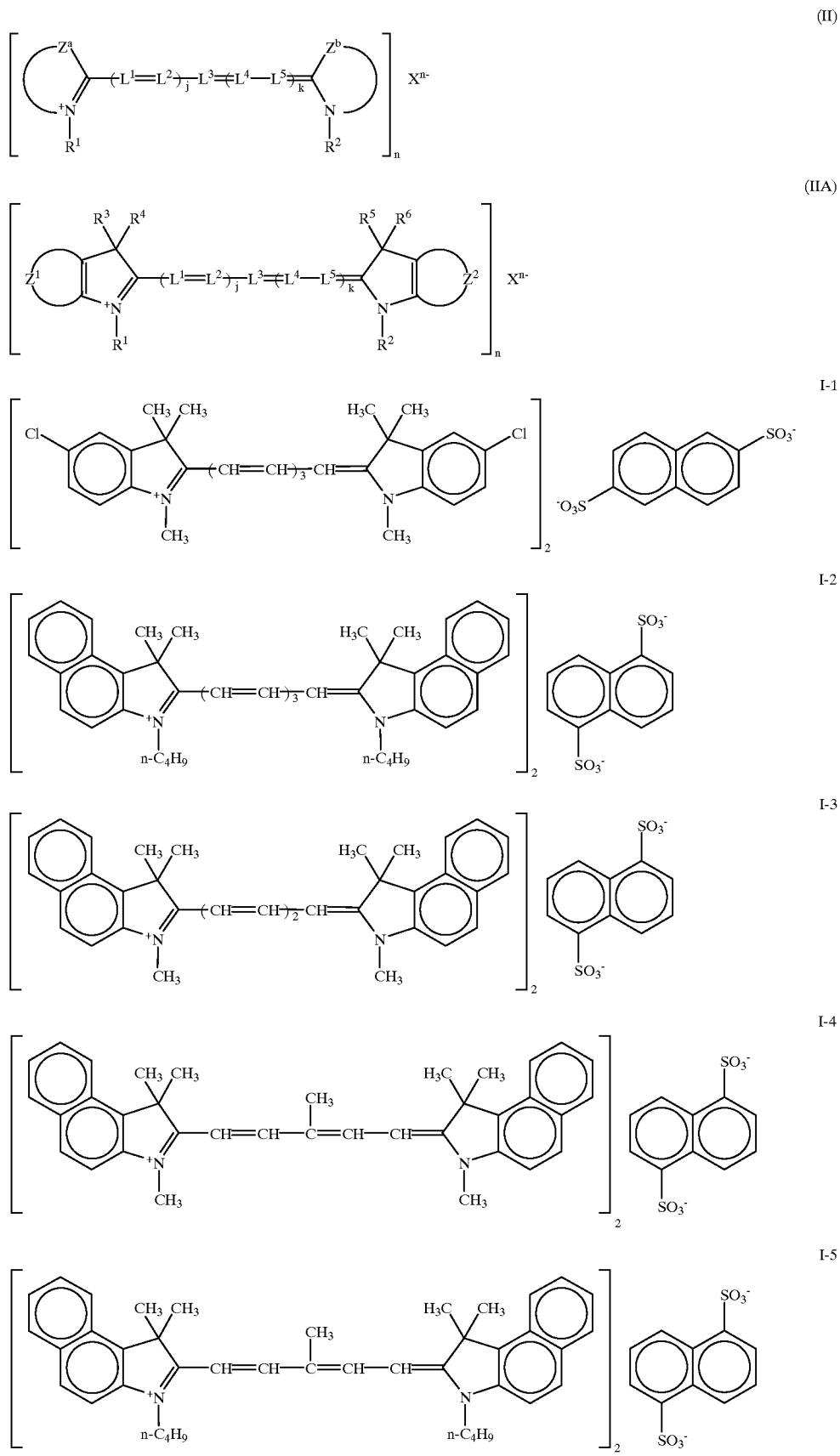

-continued
I-6
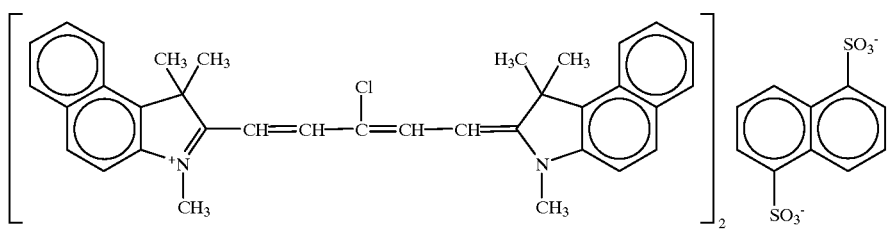
I-7
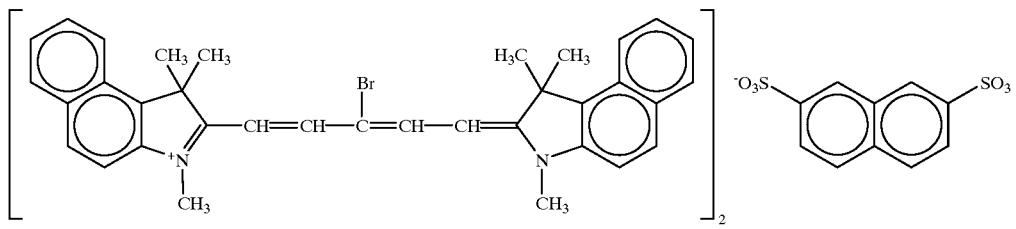
I-8
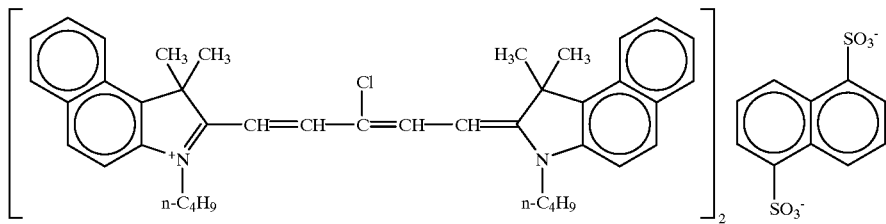
I-9
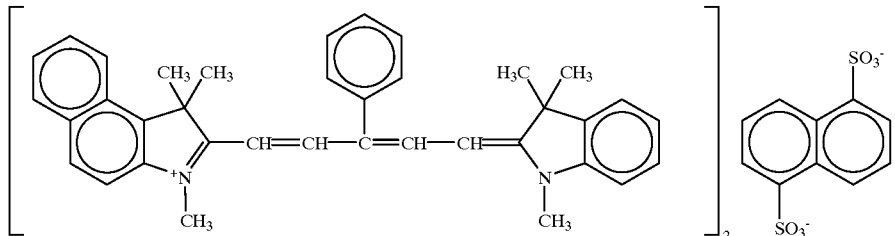
I-10
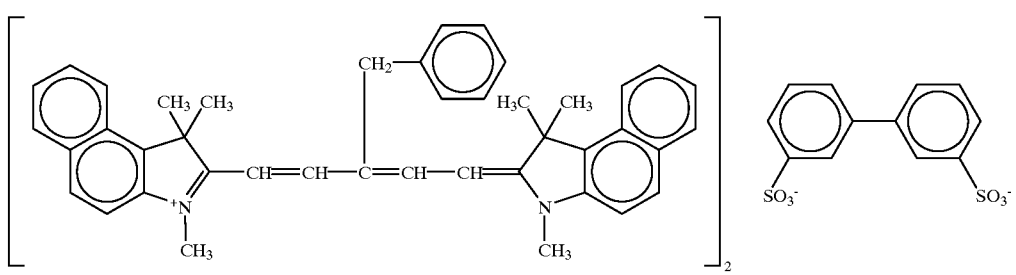
I-11
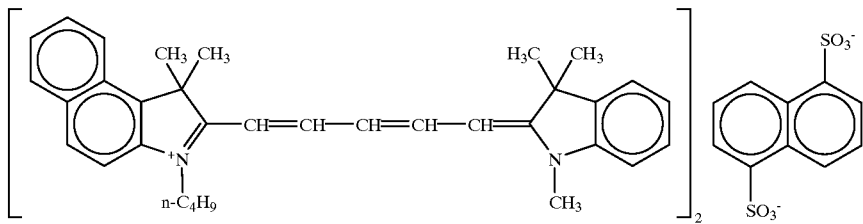

-continued
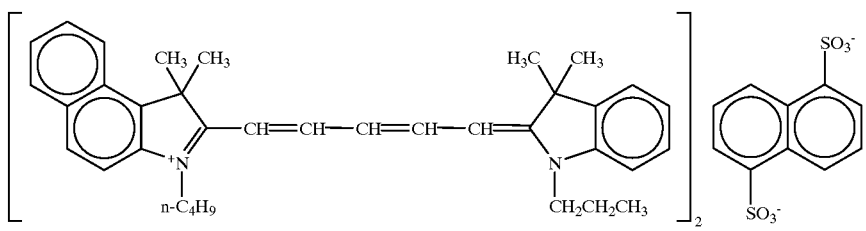
I-12
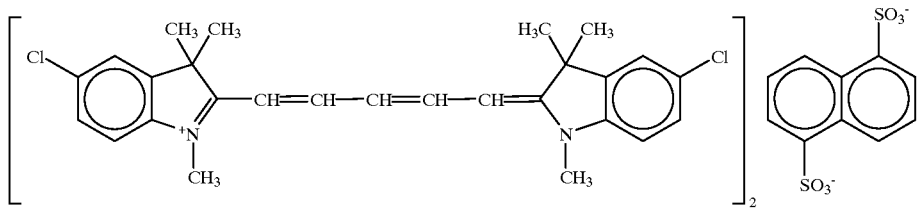
I-13
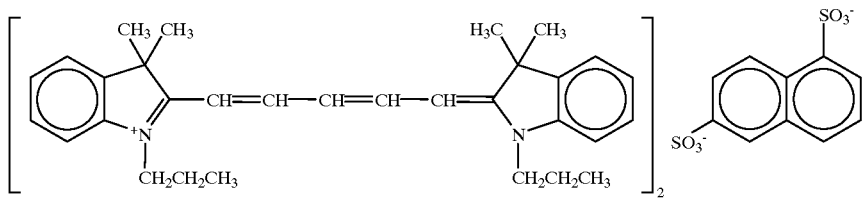
I-14
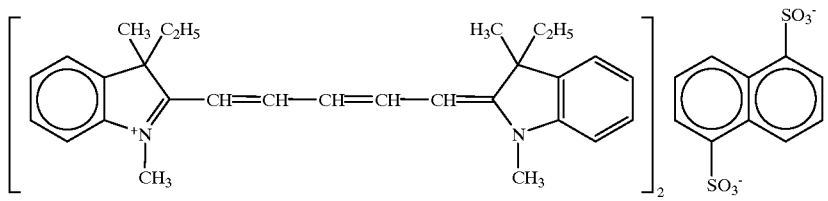
I-15
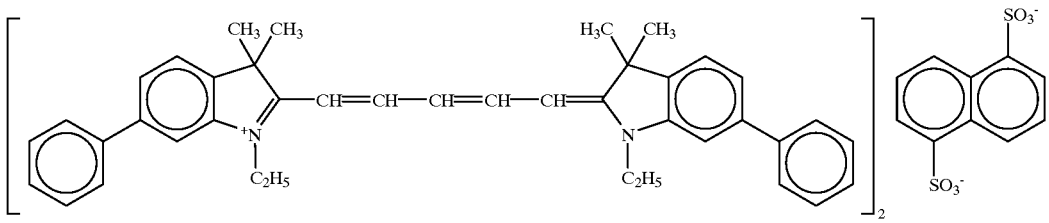
I-16
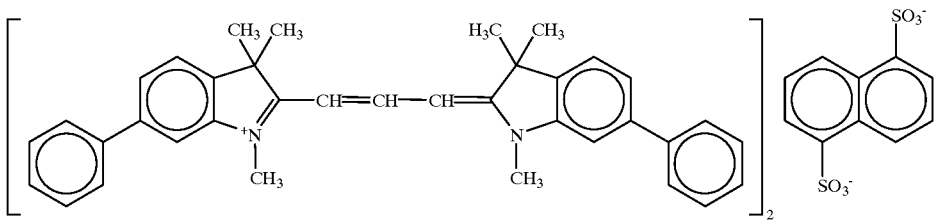
I-17
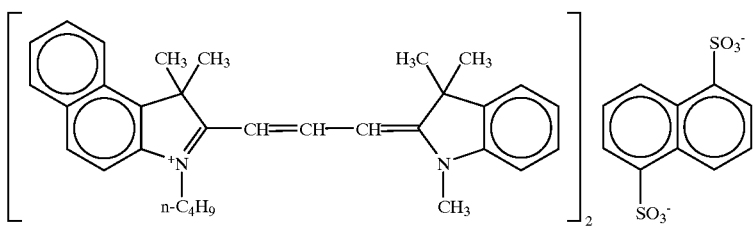
I-18

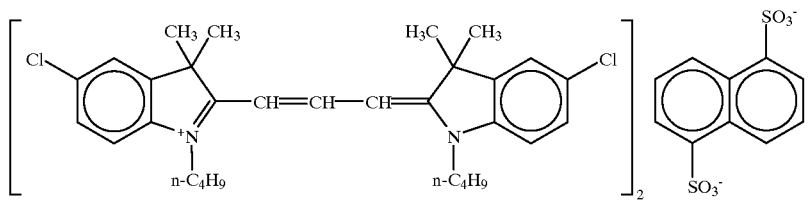
I-19
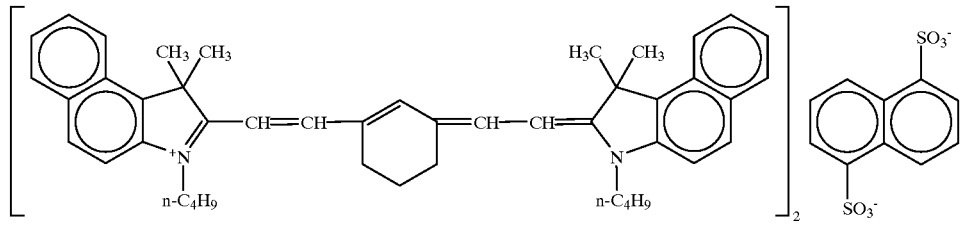
I-20
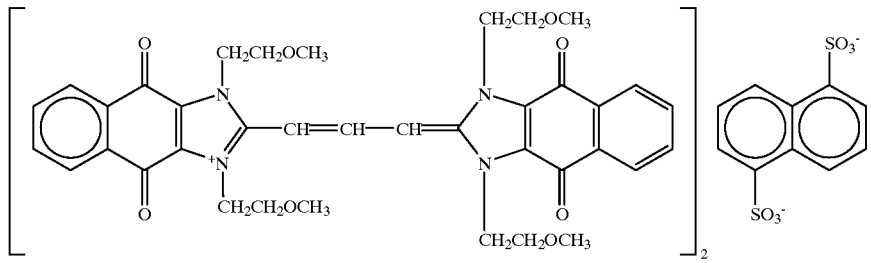
I-21
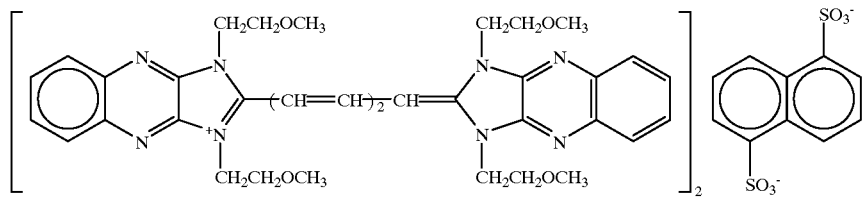
I-22
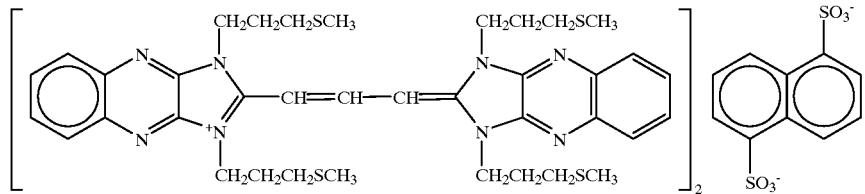
I-23
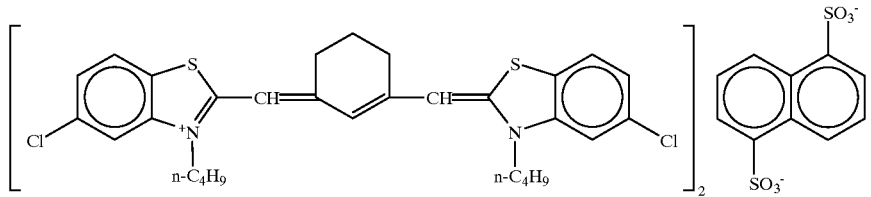
I-24
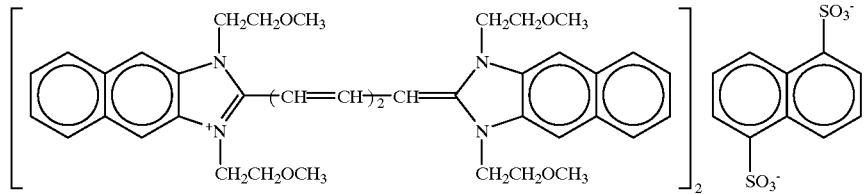
I-25

-continued
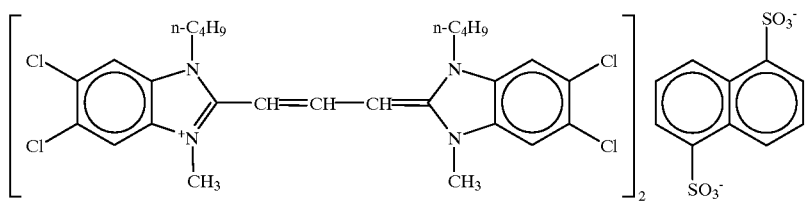
I-26
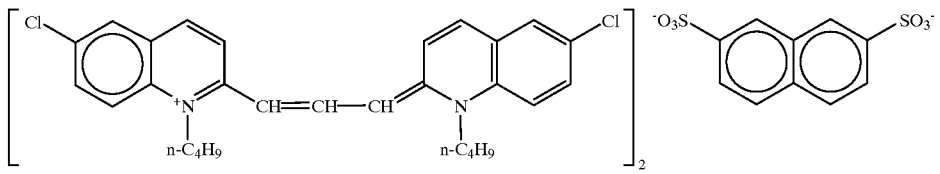
I-27
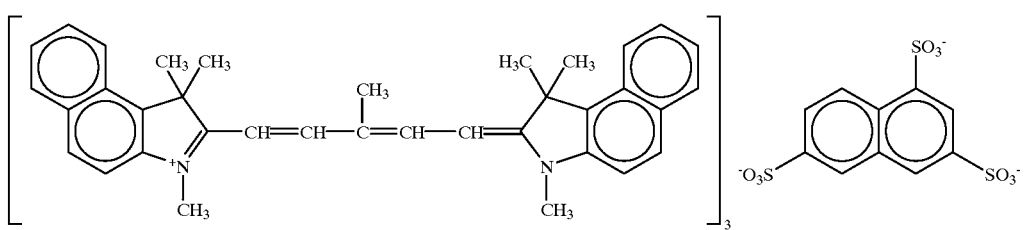
I-28
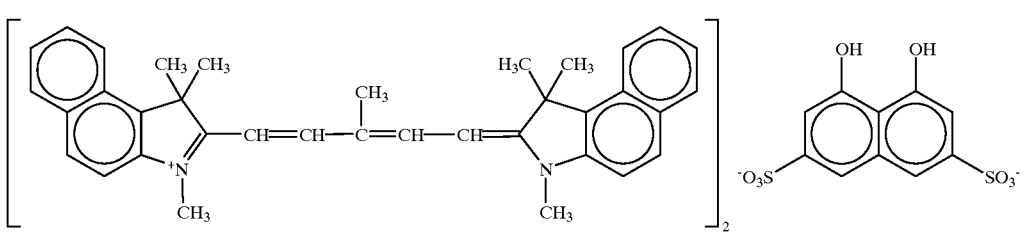
I-29
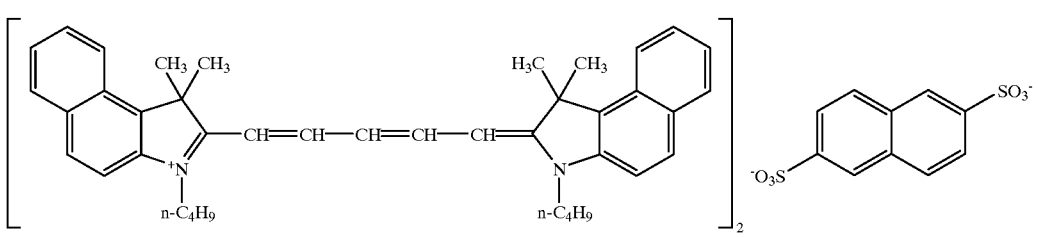
I-30
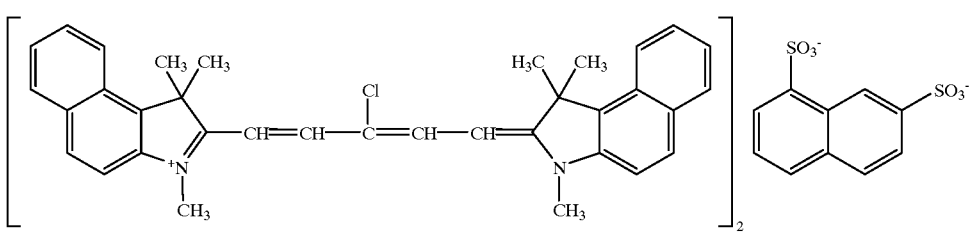
I-31
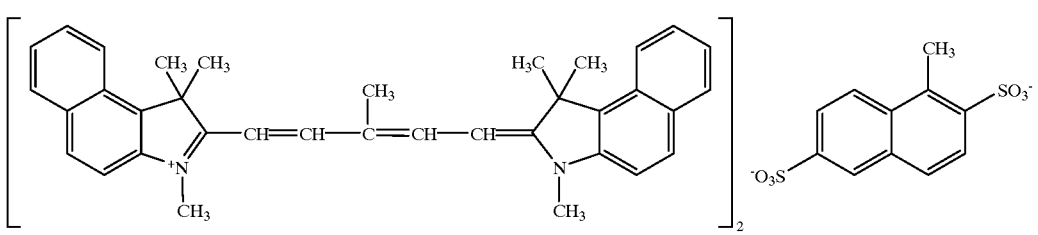
I-32

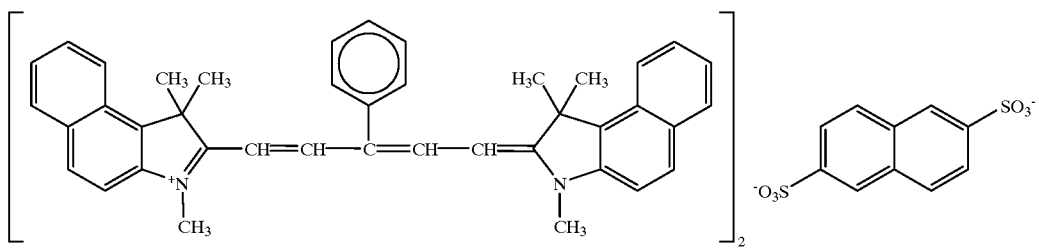

I-33

The compound of the formula (I) can be employed singly or in combination with two or more compounds.

The compound of the formula (I) can be easily prepared in the manner described in the following texts: "The Cyanine Dyes and Related Compounds 5", pp. 55-, written by F. M. Hamer (Interscience Publishers, New York, London, published in 1964); "Polymethine Dyes", pp. 23 and 38, written by Nikolai Tyutyulkov, Jurgen Fabian, Achim Ulehlhorn, Fritz Dietz and Alia Tadjer (St. Kliment Ohridski University Press, Sophia); "Heterocyclic Compounds-Special Topics in Heterocyclic Chemistry", Chapter 18, Section 14, pp. 482–515, written by D. M. Sturmer (John Wiley & Sons, New York, London, published in 1977); and "Rodd's Chemistry of Carbon Compounds, 2nd edition, part B", Chapter 15, pp. 369–422 (1977), Chapter 15, pp. 267–296 (1985) (Elsevir Science Publishing Company Inc., New York).

The polyvalent organic anion can be introduced into the dye as a counter ion, for example, in the following manner.

The cyanine dye having a monovalent counter ion is dissolved in an appropriate solvent. To the solution, a solution of polyvalent organic acid or its salt is added and then optionally another solvent in which the dye is insoluble is added to precipitate a dye having a polyvalent organic counter anion. This method is very easy and suitable for synthesis on a large scale. Besides that, the polyvalent organic anion can be also introduced by means of ion exchange resin.

The cyanine dye of the invention can be prepared in the manner concretely described in the following synthesis example.

SYNTHESIS EXAMPLE

Preparation of the Compound I-4

A compound consisting of the cation part of the compound I-4 and p-toluenesulfonate anion was prepared in the known manner. 23.8 g (0.04 mol) of the prepared compound was dissolved in 400 ml of methanol, and then 7.2 g (0.02 mol) of naphthalene-1,5-disulfonic acid was added. The resulting solution was stirred at 50° C. for 1 hour. After cooling, produced precipitation was collected and washed with methanol, followed by drying at 50° C. overnight (yield: 22.3 g, melting point: 238° C.).

Next, the detailed description about the oxonol dye employable for the invention is given below.

The oxonol dye having an organic counter ion preferably is a compound having the following formula (III-1) or (III-2):

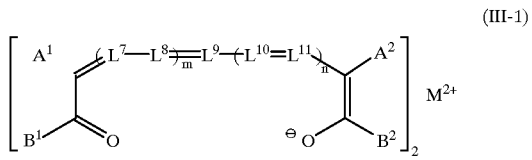

(III-1)

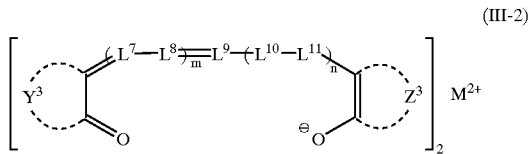

(III-2)

In the above formulas, each of $A^1$, $A^2$, $B^1$ and $B^2$ independently represents a substituent group. Each of $Y^3$ and $Z^3$ independently represents an atomic group required for forming a carbon ring or a heterocyclic ring. Each of $L^7$, $L^8$, $L^9$, $L^{10}$ and $L^{11}$ independently represents a methine group which may have substituent groups. "$M^{2+}$" represents a quarternary aimmonium ion, and each of "m" and "n" independently is 0, 1 or 2.

Examples of the substituent groups (or atoms) represented by $A^1$, $A^2$, $B^1$ or $B^2$ include: a straight, branched or cyclic alkyl group of 1–18 (preferably 1–8) carbon atoms which may have substituent groups; an aralkyl group of 7–18 (preferably 7–12) carbon atoms which may have a substituent group; an alkenyl group of 2–18 (preferably 2–8) carbon atoms; an alkynyl group of 2–18 (preferably 2–8) carbon atoms; an aryl group of 6–18 (preferably 6–10) carbon atoms which may have a substituent group; an acyl group of 2–18 (preferably 2–8) carbon atoms which may have a substituent group; a sulfonyl group of 1–18 (preferably 1–8) carbon atoms which may have a substituent group; a sulfinyl group of 1–18 (preferably 1–8) carbon atoms; an alkoxycarbonyl group of 2–18 (preferably 2–8) carbon atoms; an aryloxycarbonyl group of 7–18 (preferably 7–12) carbon atoms; an alkoxy group of 1–18 (preferably 1–8) carbon atoms which may have a substituent group; an aryloxy group of 6–18 (preferably 6–10) carbon atoms which may have substituent groups; an alkylthio group of 1–18 (preferably 1–8) carbon atoms; an arylthio group of 6–10 carbon atoms; an acyloxy group of 2–18 (preferably 2–8) carbon atoms which may have substituent groups; a sulfonyloxy group of 1–18 (preferably 1–8) carbon atoms which may have a substituent group; a carbamoyloxy group of 2–18 (preferably 2–8) carbon atoms which may have a substituent group; an amino group having 0–18 (preferably 0–8) carbon atoms which may have a substituent group; a carbamoyl group of 1–18 (preferably 1–8) carbon atoms which may have a substituent group; a sulfamoyl group having 0–18 (preferably 0–8) carbon atoms which may have a substituent group; a halogen atom (e.g., fluorine, chlorine, or bromine);

hydroxyl group; nitro group; cyano group; carboxyl group; and a heterocyclic group. Preferably, the substituent group of $A^1$ or $A^2$ is cyano group, nitro group, an alkoxycarbonyl group, an acyl group, a carbamoyloxy group, a sulfamoyl group, an alkylsulfonyl group, or an arylsulfonyl group. The substituent group of $B^1$ or $B^2$ preferably is an alkyl group, an aryl group, an alkoxy group or amino group.

Examples of the carbon ring represented by $Y^3$ or $Z^3$ are as follows. In the following formulas, each of Ra and Rb independently represents hydrogen atom or a substituent group.

A-1
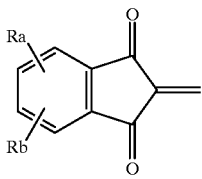

A-2
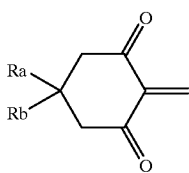

A-3
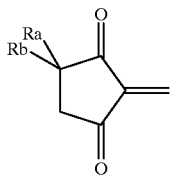

A-4
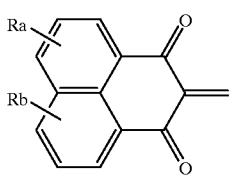

Among the above, A-1 and A-2 are preferred.

Examples of the heterocyclic rings represented by $Y^3$ or $Z^3$ are as follows. In the following formulas, each of Ra, Rb and Rc independently represents hydrogen atom or a substituent group.

A-5
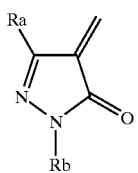

A-6
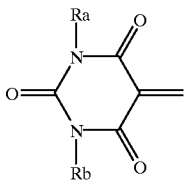

-continued

A-7
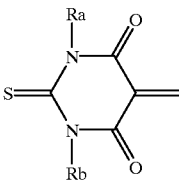

A-8
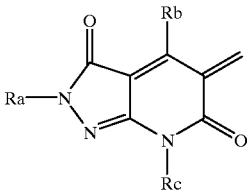

A-9
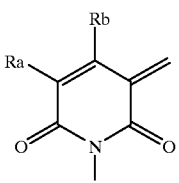

A-10
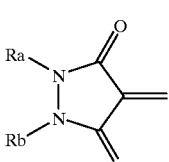

A-11
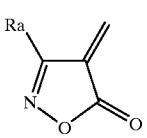

A-12
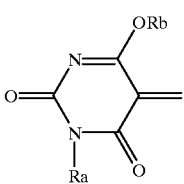

A-13
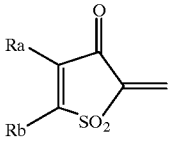

A-14
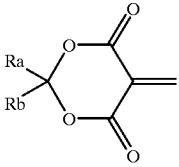

A-15
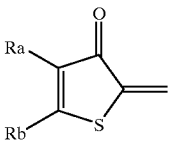

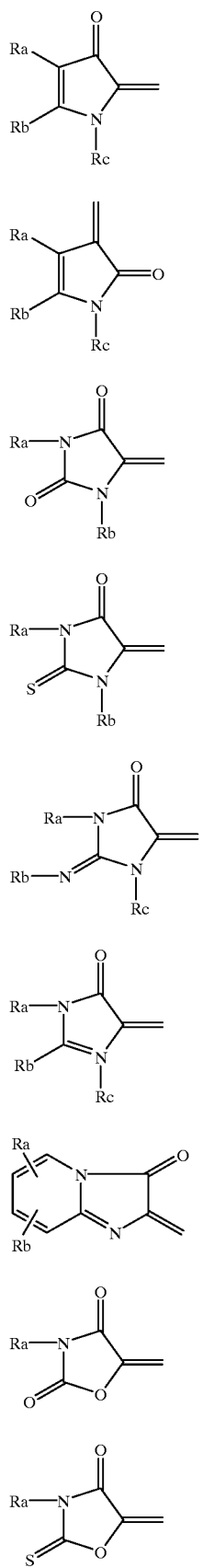
A-16 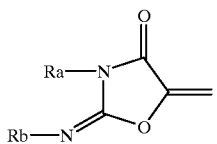
A-17 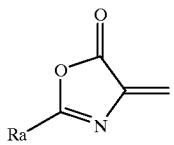
A-18 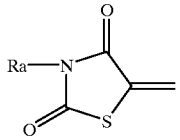
A-19 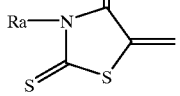
A-20 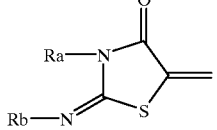
A-21 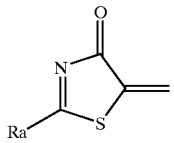
A-22
A-23
A-24
A-25
A-26
A-27 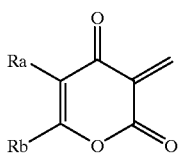
A-28
A-29 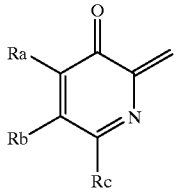
A-30
A-31
A-32
A-33 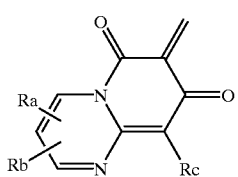

A-34 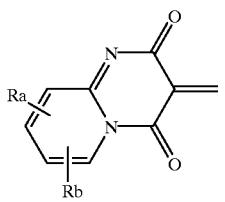

A-35 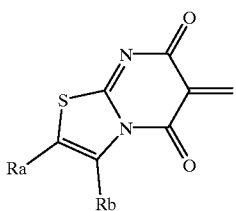

A-36 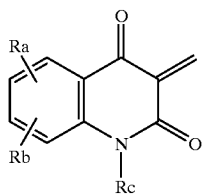

A-37 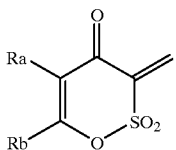

A-38 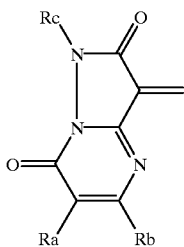

A-39 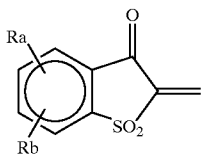

A-40 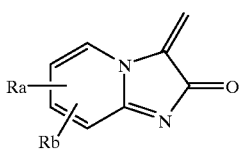

A-41 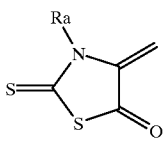

A-42 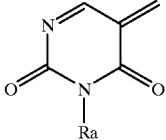

Among the above, preferred examples are A-5, A-6 and A-7.

Examples of the substituent group represented by Ra, Rb or Rc are the same as those described above for $A^1$, $A^2$, $A^2$, $B^1$ or $B^2$. The substituent groups of Ra, Rb and Rc may be combined to form a carbon ring or a heterocyclic ring.

Each of $L^7$, $L^8$, $L^9$, $L^{10}$ and $L^{11}$ independently represents a methine group which may have substituent groups (preferred examples of the substituent groups are the same as those described above for $A^1$, $A^2$, $B^1$ or $B^2$). The integers of "m" and "n" are preferably m=1 and n=1, m=0 and n=2, or m=2 and n=0.

The quarternary ammonium ion of $M^{2+}$ preferably is an ion represented by the following formula (IV) or (V):

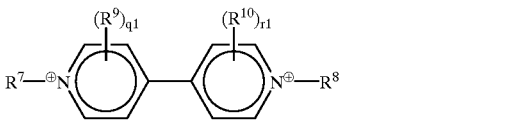   (IV)

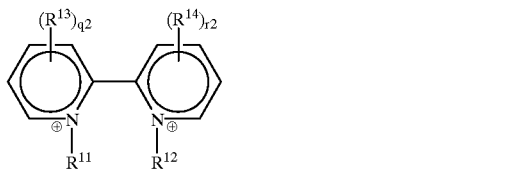   (V)

In the above formulas, each of $R^7$, $R^8$, $R^{11}$ and $R^{12}$ independently represents an alkyl group, an alkenyl group, an alkynyl group or an aryl group. Each of $R^9$, $R^{10}$, $R^{13}$ and $R^{14}$ independently represents a substituent group (atom). Each set of $R^7$ and $R^8$, $R^9$ and $R^{10}$, $R^{11}$ and $R^{12}$, and $R^{13}$ and $R^{14}$ may be combined to form a ring; or each set of $R^7$ and $R^9$, $R^8$ and $R^{10}$, $R^{11}$ and $R^{13}$, and $R^{12}$ and $R^{14}$ may be combined to form a ring. Each of q1, q2, r1 and r2 independently represents an integer of 0–4; and in the case that q1, q2, r1 or r2 is not less than 2, a plural number of corresponding $R^9$, $R^{10}$, $R^{13}$ or $R^{14}$ may be the same or different, respectively.

The alkyl group represented by $R^7$, $R^8$, $R^{11}$ and $R^{12}$ preferably is an alkyl group of 1–18 carbon atoms which may have a substituent group. The alkenyl group represented by $R^7$, $R^8$, $R^{11}$ and $R^{12}$ preferably is an alkenyl group of 2–18 carbon atoms which may have a substituent group. The alkynyl group represented by $R^7$, $R^8$, $R^{11}$ and $R^{12}$ preferably is an alkynyl group of 2–18 carbon atoms which may have a substituent group. The aryl group represented by $R^7$, $R^8$, $R^{11}$ and $R^{12}$ preferably is an aryl group of 6–18 carbon atoms which may have a substituent group.

Examples of the substituent groups (or atoms) of the above alkyl group, alkenyl group, alkynyl group or aryl group include: a halogen atom; an alkoxy group of 1–18 (preferably 1–8) carbon atoms which may have a substituent group; an aryloxy group of 6–10 carbon atoms which may have a substituent group; an alkylthio group of 1–18 (preferably 1–8) carbon atoms which may have a substituent group; an arylthio group of 6–10 carbon atoms which may have a substituent group; an acyl group of 2–18 (preferably 2–8) carbon atoms which may have a substituent group; a sulfonyl group of 1–18 (preferably 1–8) carbon atoms which may have substituent groups; an acyloxy group of 2–18 (preferably 2–8) carbon atoms which may have substituent groups; an alkoxycarbonyl group of 2–18 (preferably 2–8) carbon atoms which may have a substituent group; an alkenyl group of 2–18 (preferably 2–8) carbon atoms which may have a substituent group; an alkynyl group of 2–18 (preferably 2–8) carbon atoms which may have a substituent group; an aryl group of 6–10 carbon atoms which may have a substituent group; an aryloxycarbonyl group of 7–11 carbon atoms which may have a substituent group; an amino group having 0–18 (preferably 0–8) carbon atoms which may have a substituent group; a carbamoyl group of 1–18 (preferably 1–8) carbon atoms which may have a substituent group; a sulfamoyl group having 0–18 (preferably 0–8) carbon atoms which may have a substituent group; hydroxyl group; nitro group; cyano group; carboxyl group; and a heterocyclic group.

Examples of the substituent groups represented by $R^9$, $R^{10}$, $R^{13}$ or $R^{14}$ are the same as those described above for $A^1$, $A^2$, $B^1$ or $B^2$, and preferred are hydrogen atom and an alkyl group.

In the invention, $R^{11}$ and $R^{12}$ are preferably combined to form a ring, and the ring preferably consists of 5- to 7-members (more preferably 6-members). Further, $R^9$ and $R^{10}$, or $R^{13}$ and $R^{14}$ are also preferably combined to form a carbon ring or a heterocyclic ring (preferred is a carbon ring). It is particularly preferred for the set of $R^9$ and $R^{10}$ or that of $R^{13}$ and $R^{14}$ to be combined to form a condensed ring with the pyridine ring to which they are connected. The typical examples of the oxonol dye having an organic counter ion are as follows.

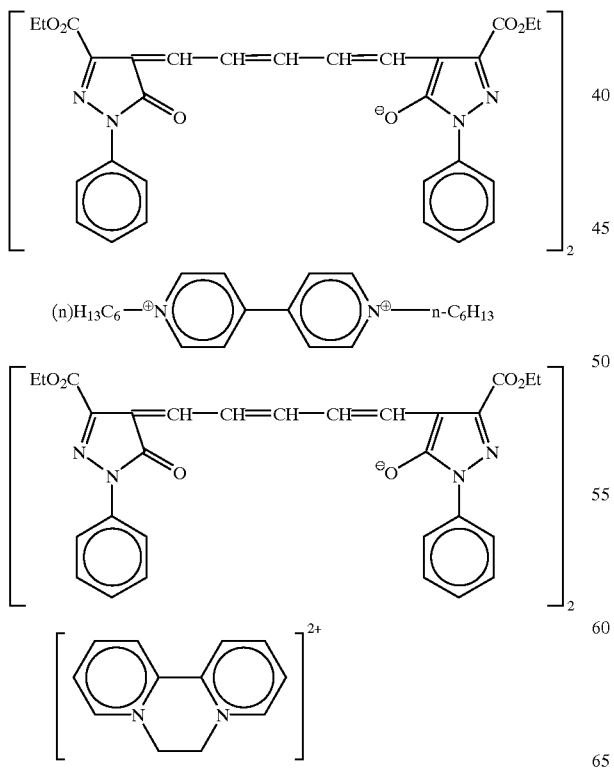

The recording dye layer of the invention preferably contains an anti-fading agent represented by the following formula (A1) or (A2).

With respect to the compound (anti-fading agent) of the formula (A1) or (A2), a detailed description is given below.

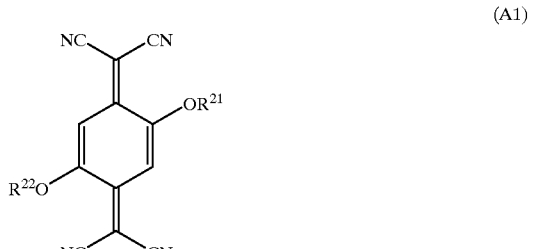

(A1)

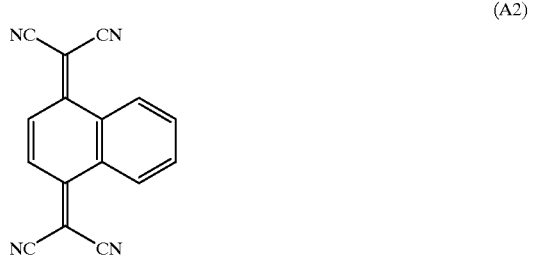

(A2)

In the formula (A1), each of $R^{21}$ and $R^{22}$ independently represents a hydrocarbon group. Preferably, the hydrocarbon group is an unsubstituted alkyl group having 1–18 (more preferably 1–10, further preferably 1–6) carbon atoms which may form a straight, branched or cyclic chain. Particularly preferred is an unsubstituted alkyl group having 1–10 (more preferably 1–6) carbon atoms which may form a straight or branched chain. Examples of the alkyrl groups include methyl, ethyl, propyl, iso-propyl, butyl, iso-butyl, tert-butyl, pentyl, hexyl, octyl and decyl. Concrete examples of the compound represented by the formula (A1) are shown below.

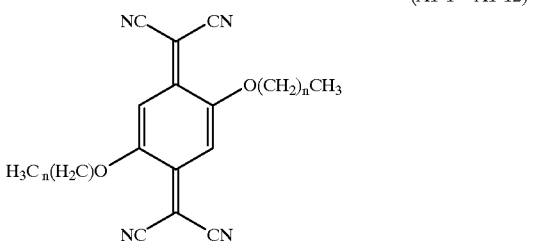

(A1-1 ~ A1-12)

n = 0 ~ 11

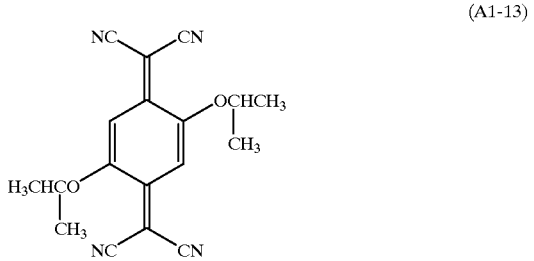

(A1-13)

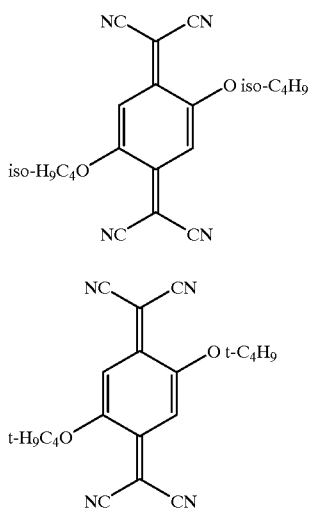

The compound of the formula (A1) or (A2) can be employed singly or in combination with two or more compounds.

The optical information recording medium of the invention has the light-reflecting layer made of inorganic material comprising Ag. The light-reflecting layer is preferably made of Ag or an alloy of Ag with at least one element selected from the group consisting of Pt, Cu, Au and Al. More preferably, the light-reflecting layer is made of Ag. In the case that the alloy of Ag is employed, the content of the elements other than Ag is less than 40 wt. %, preferably less than 30 wt. %, and further preferably less than 20 wt. %. Needless to say, the light-reflecting layer may further contain auxiliary elements (e.g., O, F and S) or compounds so as to, for example, improve characteristics such as preservation stability.

The optical information recording medium of the invention comprises a transparent substrate, a recording dye layer comprising a dye which has an organic counter ion, and a light-reflecting layer made of Ag or Ag-containing alloy overlaid in this order. A protective layer is preferably provided on the light-reflecting layer.

The optical information recording medium of the invention can be prepared, for example, in the following manner.

The transparent substrate (support) can be made of any of materials known as the materials for the producing the substrate of the known optical information recording medium. Examples of the materials include glass, polycarbonate, acrylic resins such as polymethyl methacrylate, vinyl chloride resins such as polyvinyl chloride and vinyl chloride copolymer, epoxy resins, amorphous polyolefins, and polyesters. These materials can be employed in combination, if desired. These materials are molded to give a film or a rigid plate. Among the above, polycarbonate is most preferred from the viewpoints of humidity resistance and dimensional stability.

The substrate may have an undercoating layer on its surface of the recording layer side, so as to increase surface smoothness and adhesion and to keep the recording dye layer from deterioration. Examples of the materials for the undercoating layer include polymers such as polymethyl methacrylate, acrylate-methacrylate copolymer, styrene-maleic anhydride copolymer, polyvinyl alcohol, N-methylolacrylamide, styrene-vinyltoluene copolymer, chloro-sulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and surface treating agents such as a silane-coupling agent.

The undercoating layer can be formed by applying a coating solution (in which one or more of the above-mentioned materials are dissolved or dispersed) onto the surface of the substrate by the known coating methods such as spin-coat, dip-coat, and extrusion-coat. The undercoating layer generally has a thickness of 0.005 to 20 μm, preferably 0.01 to 10 μm.

On the surface of the substrate or on the undercoating layer, pregroove for tracking or giving address signals is formed. The pregroove is preferably formed directly on the surface of the substrate when the substrate is molded from polymer material by injection or extrusion.

Alternatively, the pregroove can be provided on the surface of the substrate by placing a pregroove layer. The pregroove layer can be produced from a mixture of a monomer (such as monoester, diester, triester and tetraester) of acrylic acid (or its oligomer) and a photo-polymerization reaction initiator. The pregroove layer can be produced by the steps of coating a precisely produced stamper with the mixture of the polymerization initiator and the monomer such as the above-mentioned acrylic ester, placing a substrate on the coated layer, and irradiating the coated layer with ultra-violet rays through the stamper or the substrate so as to cure the coated layer as well as to combine the cured layer and the substrate. The substrate to which the cured coated layer is attached is separated from the stamper, to give the desired substrate equipped with the pregroove layer. The thickness of the pregroove layer is generally in the range of 0.05 to 100 μm, preferably in the range of 0.1 to 50 μm.

The pregroove formed on the substrate preferably has a depth in the range of 100 to 3,000 angstroms and a half-width of 0.2 to 0.9 μm. A depth of 1,500 to 2,000 angstroms of the pregroove is preferably adopted because such pregroove can enhance the sensitivity without decreasing the light-reflection on the substrate. The optical disc having a recording layer coated on the deep pregroove and a light-reflection layer shows a high sensitivity, and hence is employable even in a recording system using a laser beam of low power. This means that a semiconductor laser having a low output power can be employed, and the life of semiconductor laser is prolonged.

On the substrate provided with the pregroove, the recording dye layer is placed.

The recording dye layer can be formed on the substrate (support) by the steps of dissolving the dye having an organic counter ion and, if desired, the above anti-fading agent and a binder in a solvent to prepare a coating liquid, applying the coating liquid onto the substrate to form a layer, and then drying the coated layer. The compound (anti-fading agent) of the formula (A1) or (A2) is employed in an amount of 0.1 to 50 wt. %, preferably 0.5 to 45 wt. %, more preferably 3 to 40 wt. %, further preferably 5 to 25 wt. %, based on that of the dye.

Examples of solvents for the coating liquid include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexanone; ethers such as tetrahydrofuran, diethyl ether and dioxane; alcohols such as ethanol, n-propanol, isopropanol, n-butanol, and diacetone alcohol; fluorine containing solvents such as 2,2,3,3-tetrafluoropropanol; and glycol ethers such as ethyleneglycol monomethyl ether, ethyleneglycol monoethyl ether, and propyleneglycol monomethyl ether. These solvents may be employed singly or in combination, in consideration of the solubility of the used compound in the solvent. The coating liquid can further contain auxiliary additives such as an oxidation inhibitor, a UV absorber, a plasticizer, and a lubricant.

Examples of the binders include natural-origin polymers such as gelatin, cellulose derivatives, dextran, rosin, and rubber; hydrocarbon polymer resins such as polyethylene, polypropylene, polystyrene and polyisobutyrene; vinyl polymers such as polyvinyl chloride, polyvinylidene chloride, and vinyl chloride-vinyl acetate copolymer; acrylate polymers such as polymethyl acrylate and polymethyl methacrylate; polyvinyl alcohol, chlorinated polyethylene; epoxy resins; butyral resins, rubber derivatives, and thermosetting resins such as prepolymers of phenol-formaldehyde. The binder is optionally employed so that the ratio of the binder to the dye may be in the range of 0.01/1 to 50/1, preferably 0.1/1 to 5/1 by weight. The concentration of the coating liquid thus prepared is generally in the range of 0.01 to 10 wt. %, preferably 0.1 to 5 wt. %.

The coating can be performed by the known methods such as spray coat, spin coat, dip coat, roller coat, blade coat, doctor roller coat and screen print. The recording dye layer can be a single layer or can comprise plural layers. The thickness of the recording dye layer is generally in the range of 20 to 500 nm, preferably 50 to 300 nm. The recording dye layer can be provided on both of the surfaces of the substrate.

On the recording dye layer, the light-reflecting layer made of Ag or the above-described Ag alloy is placed. The light-reflecting layer can be formed on the recording dye layer by vacuum deposition, sputtering or ion-plating of Ag or the Ag alloy. The thickness of the light-reflecting layer generally is in the range of 10 to 800 nm, preferably 20 to 500 nm, further preferably 50 to 300 nm.

On the light-reflecting layer, a protective layer is preferably provided so as to protect the recording dye layer and the light-reflecting layer from chemical deterioration or physical shock. The protective layer can be also placed on the substrate on the face not having the recording dye layer so as to enhance the scratch resistance and the moisture resistance of the medium.

The protective layer can be made of inorganic materials such as $SiO$, $SiO_2$, $MgF_2$, $SnO_2$, $Si_3N_4$; or organic materials such as thermoplastic resins, thermo-setting resins, and UV curable resins.

The protective layer can be formed on the light-reflecting layer and/or the substrate by laminating a film of plastic material using an adhesive. The inorganic material can be also placed on the light-reflecting layer and/or the substrate by vacuum deposition or sputtering. Otherwise, the organic polymer material can be formed by the steps of dissolving the polymer material to prepare a coating solution, applying the coating solution to form a layer, and drying the coated layer to give the protective layer. For example, a UV curable resin is dissolved in a solvent and applied on the light-reflecting layer and/or the substrate, and then cured by applying ultra-violet rays to the coated layer. The protective layer can contain various additives such as an anti-static agent, an oxidation inhibitor, and a ultra-violet absorber. The protective layer generally has a thickness of 0.1 to 100 $\mu m$.

The information recording medium of the invention may comprise one substrate. Besides that, the invention can be applied for a laminated type medium. The laminated type medium can be prepared by laminating two substrates (at least one of which has the structure of the invention) with adhesive so that the recording dye layer may be positioned inside. If the two substrates are laminated via spacer rings (an inner spacer ring and an outer spacer ring), an air-sandwich type medium can be obtained.

The information recording medium comprising one substrate shows high light-reflection, and hence the reproduction of the recorded information can be accomplished by means of a commercially available CD player.

The information recording medium of the invention can be also applied for a recordable digital video disc (DVD-R), on which information can be recorded in high density.

The DVD-R according to the present invention can be prepared in the following manner.

On the transparent disk substrate (diameter: 120±3 mm) having a pregroove of 0.8 $\mu m$ track pitch (which is narrower than 1.6 $\mu m$ track pitch of CD-R), the recording dye layer of the invention, the light-reflecting layer of the invention and usually the protective layer are over-laid in this order to form a disc. Thus formed disc and another disc (a protective disc substrate having the same shape or a disc independently formed by repeating the same procedure as described above) are laminated via adhesive so that the recording dye layer can be placed positioned inside.

Using the information recording medium of the invention, the information recording can be carried out not only at a normal line rate (1.2 to 1.4 m/sec., in the case of CD format) but also at a fourfold line rate and a sixfold or more line rate. The recording procedure is preferred to be carried out at a line rate of more than 4 m/sec. (more preferably 4.5 to 10 m/sec.).

The high speed recording/reproducing procedures are carried out with the recording medium of the invention in the following manner.

The information recording medium is made to rotate at a line rate of more than 4 m/sec. On the rotating medium, a recording light source such as a semiconductor laser beam is applied through the transparent substrate. By the application of the laser beam, pits are formed in the recording dye layer. The pit is assumed to be produced by local vacancy of the recording layer, deformation of the recording dye layer and/or the substrate, and change of the physical or chemical characteristics of the recording dye layer. The light source preferably is a semiconductor laser having an oscillation frequency in the range of 500 to 850 nm. The preferred beam wavelength is in the range of 500 to 800 nm. In the case of the CR-R type recording medium, the laser beam preferably has a wavelength of 770 to 790 nm. In the case of the DVD-R type recording medium, the wavelength is preferably in the range of 630 to 680 nm.

The reproduction of the recorded information can be accomplished by applying a semiconductor laser beam on the medium rotating at a line rate in the range of a normal rate to a thirty-fold rate. The light-reflection is then detected from the substrate side.

The present invention is further described by the following non-restrictive working examples.

EXAMPLE AND COMPARISON EXAMPLE

Example 1

The cyanine dye (I-4) and the anti-fading agent (hereinafter referred to as "quencher") (A1-1) were dissolved in 2,2,3,3-tetrafluoropropanol by ultrasonic solution method (for 1 hour), to prepare a coating liquid for recording dye layer (weight ratio of quencher/dye was 1/10). Thus prepared coating liquid had a concentration of 2.65 weight/volume %.

The coating liquid was then coated by spin-coat on the surface (on which pregroove was formed) of a polycarbonate substrate (diameter: 120 mm, thickness: 1.2 mm, Panlight AD5503 [trade name], available from Teijin Limited) to give a recording dye layer (average thickness at the pregroove: approx. 150 nm). The pregroove was beforehand formed spirally on the substrate (track pitch: 1.6 μm, pregroove width: 0.5 μm, depth: 0.17 μm) by injection molding.

On the coated dye layer, a light-reflecting layer made of Ag (thickness: about 90 nm) was provided by sputtering with DC magnetron sputtering apparatus (sputtering power: 1.5 kW, sputtering gas pressure: 2 Pa, sputtering gas: Ar, gas flow: 50 sccm).

After that, a UV curable photopolymer (SD-1700 [trade name], available from Dainippon Ink & Chemicals, Inc.) was coated by spin-coat on the light-reflecting layer, and then irradiated with ultra-violet rays to be cured to form a protective layer of 10 μm thick. Thus, an information recording medium of CD-R type (a sample disc) of the invention was prepared.

Comparison Example 1

The procedure of Example 1 was repeated except that the following cyanine dye (a) was used to prepare an information recording medium of CD-R type for comparison.

(a)

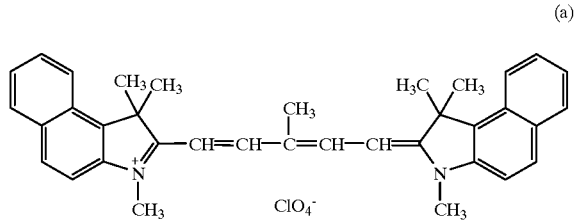

Evaluation of Optical Information Recording Medium (1) Measurement of Reflectance After the sample was stored at 23° C., 50% RH for 24 hours, the reflectance was measured in the following manner On the sample rotating at 1.2 m/second, EFM signals were recorded by means of a semiconductor laser beam of wavelength 787 nm. The laser power was varied at the step of 0.5 mW between 4.0 mW and 8.0 mW. While the sample was kept to be rotating at 1.2 m/second, the recorded signals were then reproduced by means of OTM-2000 (trade name, available from Pulsetech) with the laser beam (laser power: 0.5 mW), and the reflectance at the non-recorded pregroove area (on which the signals were not recorded) was measured under the optimum power. The results are shown in Table 1.

TABLE 1

|  | recording dye layer | | light-reflecting | reflectance |
| --- | --- | --- | --- | --- |
|  | dye | counter ion | layer | (%) |
| Ex.1 | I-4 | naphthalene-1,5-disulfonate ion | Ag | 72 |
| C. Ex.1 | a | ClO$_4$ | Ag | 68 |

Remark: Each of the above samples had good reproducing characteristics.

The results shown in Table 1 indicate the following fact.

Even if the light-reflecting layer is made of Ag, the sample of the invention (Example 1), which comprises a recording dye layer of a cyanine dye with an organic counter ion, gives a relatively high light-reflectance, as compared with the sample for comparison (comparison Example 1), which comprises a recording dye layer of a conventional cyanine dye having a ClO$_4^-$ ion.

What is claimed is:

1. An optical information recording medium comprising a substrate, a recording dye layer on which information can be recorded by irradiation with a laser beam, and a light-reflecting layer overlaid in order, wherein the recording dye layer comprises a quencher and a cyanine dye of the following formula (I):

$$[DYE^+]_n X^{n-} \qquad (I)$$

in which DYE$^+$ represents a monovalent cyanine dye cation, n is 2 or 3 and X$^{n-}$ is an aromatic disulfonate ion or an aromatic trisulfonate ion, and the light-reflecting layer consists essentially of Ag.

2. The optical information recording medium of claim 1, wherein the cyanine dye is represented by the following formula (II):

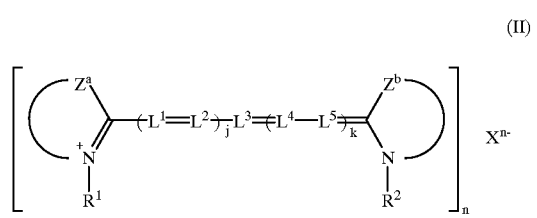

in which each of Za and Zb independently represents an atomic group required for forming a 5- or 6-membered nitrogen-containing heterocyclic ring; each of R$^1$ and R$^2$ independently represents an alkyl group or an aryl group; each of L$^1$, L$^2$, L$^3$, L$^4$ and L$^5$ independently represents a methine group which may have a substituent group, and in the case where at least two of L$^1$ to L$^5$ have a substituent group, one of L$^1$ to L$^5$ may be combined with another of L$^1$ to L$^5$ to form a ring; j represents 0, 1 or 2; k represents 0 or 1; X$^{n-}$ is an aromatic disulfonate ion or an aromatic trisulfonate ion and n is 2 or 3.

3. The optical information recording medium of claim 2, wherein each of Za and Zb independently represents an atomic group required for forming a nucleus selected from the group consisting of benzothiazole nucleus, imidazole nucleus, naphthoimidazole nucleus, quinoline nucleus, isoquinoline nucleus, imidazo (4, 5-b) quinoxaline nucleus, thiadiazole nucleus, tetrazole nucleus, and pyrimidine nucleus.

4. The optical information recording medium of claim 2, wherein each of Za and Zb independently has a substituent group selected from the group consisting of a halogen atom, an alkyl group, an alkyl group having a substituent group, and an aryl group.

5. The optical information recording medium of claim 1, wherein the cyanine dye is represented by the following formula (IIA):

(IIA)

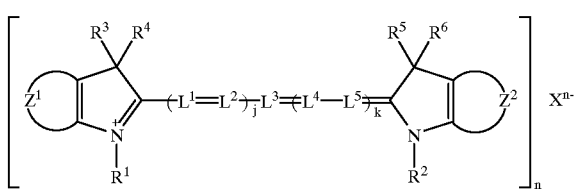

in which each of $Z^1$ and $Z^2$ independently represents an atomic group required for forming an indolenine nucleus or a benzoindolenine nucleus; each of $R^1$ and $R^2$ independently represents an alkyl group or an aryl group; each or $R^3$, $R^4$, $R^5$ and $R^6$ independently represents an alkyl group; each of $L^1$, $L^2$, $L^3$, $L^4$ and $L^5$ independently represents a methine group which may have a substituent group, and in the case where at least two of $L^1$ to $L^5$ have a substituent group, one of $L^1$ to $L^5$ may be combined with another of $L^1$ to $L^5$ to form a ring; j represents 0, 1 or 2; k represents 0 or 1; $X^{n-}$ is an aromatic disulfonate ion or an aromatic trisulfonate ion and n is 2 or 3.

6. The optical information recording medium of claim 5, wherein each of $Z^1$ and $Z^2$ independently has a substituent group selected from the group consisting of a halogen atom and an aryl group.

7. The optical information recording medium of claim 1, wherein the quencher is a compound having the following formula (A1) or (A2):

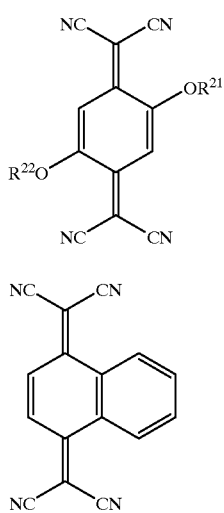

in which $R^{21}$ and $R^{22}$ independently represents a hydrocarbon group.

8. The optical information recording medium of claim 7, wherein the compound of the formula (A1) or (A2) is contained in the recording dye layer in an amount of 0.1 to 50 weight %, based on the amount of the dye.

9. The optical information recording medium of claim 1, wherein the quencher is a compound having the following formula (A1):

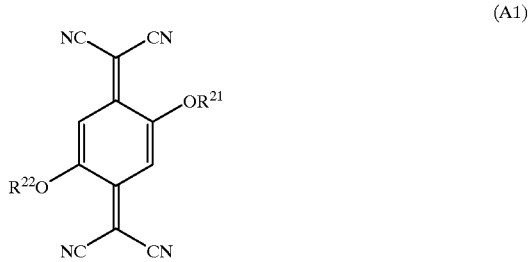

in which $R^{21}$ and $R^{22}$ independently represents an alkyl group of straight chain or branched chain which has 1 to 10 carbon atoms and no substituent group.

10. The optical information recording medium of claim 1, wherein the light-reflecting layer has a protective layer thereon.

11. The optical information recording medium of claim 1, wherein the substrate comprises polycarbonate.

12. The optical information recording medium of claim 1, wherein the recording dye layer further comprises a binder resin in an amount of 0.01 to 50 weight %, based on the amount of the dye.

13. The optical information recording medium of claim 1, wherein the substrate has on its surface a pregroove having a depth in the range of 100 to 3,000 angstroms and a half width in the range of 0.2 to 0.9 μm.

* * * * *